United States Patent
Paquet et al.

(10) Patent No.: US 12,015,589 B2
(45) Date of Patent: *Jun. 18, 2024

(54) UNIFYING WEB AND PHONE PRESENCE

(71) Applicant: Google LLC, Mountain View, CA (US)

(72) Inventors: Vincent F. Paquet, San Jose, CA (US); Tiruvilwamalai Venkatram Raman, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,785

(22) Filed: Feb. 11, 2022

(65) Prior Publication Data

US 2022/0166744 A1 May 26, 2022

Related U.S. Application Data

(63) Continuation of application No. 16/940,811, filed on Jul. 28, 2020, now Pat. No. 11,283,760, which is a (Continued)

(51) Int. Cl.
*G06F 16/335* (2019.01)
*G06F 16/2455* (2019.01)
(Continued)

(52) U.S. Cl.
CPC ...... *H04L 61/4547* (2022.05); *G06F 16/2455* (2019.01); *G06F 16/335* (2019.01);
(Continued)

(58) Field of Classification Search
CPC .......................... G06F 16/2455; G06F 16/335
See application file for complete search history.

(56) References Cited

U.S. PATENT DOCUMENTS 6,564,261 B1 * 5/2003 Gudjonsson ............ H04L 51/04
 379/900
6,788,769 B1 9/2004 Waites
(Continued)

FOREIGN PATENT DOCUMENTS

EP 1646210 4/2006
WO 02073984 9/2002

OTHER PUBLICATIONS

"Final Office Action", U.S. Appl. No. 12/415,488, dated Apr. 23, 2015, 18 pages.
(Continued)

*Primary Examiner* — Grace Park
(74) *Attorney, Agent, or Firm* — McDonnell Boehnen Hulbert & Berghoff LLP

(57) ABSTRACT

The subject matter of this specification can be embodied in, among other things, a computer-implemented method that includes obtaining, at a computer system, a plurality of contact identifiers for a computer account holder, wherein the identifiers represent a plurality of different communication modes; identifying a handle for the account holder, wherein the handle is associated with a uniform resource locator; and correlating the handle with the plurality of contact identifiers, and storing the handle and plurality of contact identifiers together so as to permit retrieval of the contact identifiers in response to identification of the handle.

17 Claims, 13 Drawing Sheets

Related U.S. Application Data continuation of application No. 15/685,082, filed on Aug. 24, 2017, now Pat. No. 10,764,236, which is a continuation of application No. 14/791,839, filed on Jul. 6, 2015, now Pat. No. 9,781,072, which is a continuation of application No. 12/415,488, filed on Mar. 31, 2009, now abandoned.

(51) Int. Cl.
| | |
|---|---|
| *G06Q 10/10* | (2023.01) |
| *H04L 51/04* | (2022.01) |
| *H04L 51/56* | (2022.01) |
| *H04L 61/45* | (2022.01) |
| *H04L 65/1069* | (2022.01) |
| *H04L 65/1096* | (2022.01) |
| *H04L 67/14* | (2022.01) |
| *H04L 67/141* | (2022.01) |
| *H04L 67/303* | (2022.01) |
| *H04L 67/306* | (2022.01) |
| *H04L 69/24* | (2022.01) |

(52) U.S. Cl.
CPC ............ *G06Q 10/10* (2013.01); *H04L 51/04* (2013.01); *H04L 51/56* (2022.05); *H04L 65/1069* (2013.01); *H04L 65/1096* (2013.01); *H04L 67/14* (2013.01); *H04L 67/141* (2013.01); *H04L 67/303* (2013.01); *H04L 67/306* (2013.01); *H04L 69/24* (2013.01)

(56) References Cited

U.S. PATENT DOCUMENTS

| | | | |
|---|---|---|---|
| 7,013,326 | B1 | 3/2006 | Suzuki et al. |
| 7,321,299 | B2 | 1/2008 | Verrier et al. |
| 9,781,072 | B2 | 10/2017 | Paquet et al. |
| 10,764,236 | B2 | 9/2020 | Paquet et al. |
| 2001/0055379 | A1 | 12/2001 | Mamiya et al. |
| 2002/0132635 | A1 | 9/2002 | Girard et al. |
| 2002/0174363 | A1 | 11/2002 | Chefalas et al. |
| 2005/0216300 | A1* | 9/2005 | Appelman .......... G06Q 30/0601 705/26.1 |
| 2006/0018441 | A1* | 1/2006 | Timmins .............. H04M 3/4211 379/88.12 |
| 2006/0041648 | A1* | 2/2006 | Horvitz ............. H04M 3/42374 709/220 |
| 2006/0281490 | A1 | 12/2006 | Dolgas et al. |
| 2007/0072642 | A1 | 3/2007 | Kangas et al. |
| 2008/0077691 | A1 | 3/2008 | Park et al. |
| 2008/0162037 | A1 | 7/2008 | Hasan Mahmoud |
| 2008/0291899 | A1 | 11/2008 | Gromoll et al. |
| 2009/0003569 | A1 | 1/2009 | Forbes et al. |
| 2010/0250592 | A1 | 9/2010 | Paquet et al. |
| 2012/0240236 | A1 | 9/2012 | Wyatt et al. |
| 2015/0312207 | A1 | 10/2015 | Paquet et al. |
| 2015/0312271 | A1 | 10/2015 | Glover et al. |
| 2017/0353425 | A1 | 12/2017 | Paquet et al. |
| 2019/0174319 | A1 | 6/2019 | Backholm et al. |
| 2020/0358739 | A1 | 11/2020 | Paquet et al. |

OTHER PUBLICATIONS

"Final Office Action", U.S. Appl. No. 12/415,488, dated Jul. 19, 2013, 13 pages.

"Final Office Action", U.S. Appl. No. 12/415,488, dated Oct. 17, 2011, 19 pages.

"Foreign Office Action", EP Application No. 10728006.7, daated Mar. 30, 2016, 5 pages.

"Foreign Office Action", EP Application No. 10728006.7, dated Oct. 11, 2019, 6 pages.

"Foreign Office Action", EP Application No. 10728006.7, dated Oct. 13, 2017, 7 pages.

"International Search Report and Written Opinion", Application No. PCT/US2010/028717, dated Jan. 26, 2011, 10 pages.

"Non-Final Office Action", U.S. Appl. No. 14/791,839, dated Jan. 13, 2017, 9 pages.

"Non-Final Office Action", U.S. Appl. No. 15/685,082, dated Feb. 6, 2020, 4 pages.

"Non-Final Office Action", U.S. Appl. No. 12/415,488, dated Mar. 13, 2014, 13 pages.

"Non-Final Office Action", U.S. Appl. No. 12/415,488, dated Apr. 15, 2011, 18 pages.

"Non-Final Office Action", U.S. Appl. No. 12/415,488, dated Nov. 5, 2012, 12 pags.

"Notice of Allowance", U.S. Appl. No. 15/685,082, dated May 7, 2020, 7 Pages.

"Notice of Allowance", U.S. Appl. No. 14/791,839, dated Jun. 2, 2017, 5 pages.

"Notice of Allowance", U.S. Appl. No. 16/940,811, dated Nov. 12, 2021, 7 pages.

"Preliminary Report on Patentability", Application No. PCT/US2010/028717, dated Oct. 4, 2011, 7 pages.

Antenucci, et al., "A Declarative Query Processing System for Nowcasting", Proceedings of the VLDB Endowment 10(3):145-156, Nov. 2016, 12 pages.

Sekhavat, "Nowcasting Mobile Games Ranking Using Web Search Query Data", International Journal of Computer Games Technology, Jan. 2016, 10 pages.

Shenoy, "Utilizing Web Data to Detect Harmful Application Software", Technical Disclosure Commons, https://www.tdcommons.org/dpubs_series/4469, Jul. 22, 2021, 12 pages.

\* cited by examiner

UNIFYING WEB AND PHONE PRESENCE

RELATED APPLICATIONS

This application is a continuation of and claims priority to U.S. Utility patent application Ser. No. 16/940,811, filed Jul. 28, 2020, which in turn claims priority to U.S. Utility patent application Ser. No. 15/685,082, filed Aug. 24, 2017, which is now U.S. Pat. No. 10,764,236, issued Sep. 1, 2020, which in turn claims priority to U.S. Utility patent application Ser. No. 14/791,839, filed Jul. 6, 2015, which is now U.S. Pat. No. 9,781,072, issued Oct. 3, 2017, which in turn claims priority to abandoned U.S. Utility patent application Ser. No. 12/415,488, filed Mar. 31, 2009, the disclosures of which are incorporated herein by reference.

TECHNICAL FIELD

This document describes systems and techniques for correlating and retrieving user contact identifiers with a handle.

BACKGROUND

The development of modern communications technologies has enabled people to communicate by more and richer mechanisms—via e-mail, text messaging, video conferencing, posting content to web pages, microblogging, and other such expanding mechanisms. This increase in communication mechanisms, however, brings about a concomitant increase in the complexity of determining someone's contact information. For example, a particular internet user may have a home telephone number, a cellular telephone number, a work telephone number, a work e-mail address, a personal e-mail address, a home page, a blog, an IM account, and other such mechanisms for communicating with others. This multitude of connection mechanisms can make it difficult to keep track of contact information for a number of friends or acquaintances. Also, it can be hard to get and enter all such information from a new acquaintance. That is why, frequently, people tell a new acquaintance to call their telephone number or e-mail them, so that they can capture, respectively, the other user's telephone number or e-mail address.

Such difficulties become even more pronounced across a user's lifetime as they move from situation to situation. For example, each time a user changes jobs, they generally lose their old work telephone number and e-mail address and acquire new ones. This may result in a business social networking site "pinging" all of their acquaintances to announce that the acquaintances should check for the new contact information. It may also result in acquaintances who are not updated in such a manner getting a wrong number or an e-mail bounce-back when they try to reach an old acquaintance.

SUMMARY

This document describes techniques for correlating and retrieving a handle with contact identifiers. In general, a user may be contacted using a single handle that triggers communication by a variety of different communication mechanisms using a plurality of communication modes, where modes are different types of communication connections such as telephone, e-mail, text messaging, and other such modes. For example, a single alphanumeric string can be submitted by a party wanting to contact the user, whether the party wants to make the contact via telephone, e-mail, chat or other such mode of communication. Thus, for example, a third party can "dial" the handle using a telephone and the handle will lead to a service that translates the handle into another telephone number where the user can currently be reached. In a similar manner, a third party can use the handle plus a common domain (e.g., gmail.com) to e-mail the user, and the e-mail message can be forwarded, using rules defined by the user, to another e-mail account or address for the user. The handle can also be used to push updates regarding various contact mechanisms out to the third party when a user changes such information, such as by sending a new vcf card to the third party.

Such systems and techniques may provide one or more advantages in certain implementations. For example, a user can provide a single point of contact to which acquaintances may point in order to be updated regarding contact information for various contact mechanisms for the user. Also, the acquaintance may be permitted to generally ignore changes in individual contact mechanisms, such as when the user switches to a new job and receives a new work telephone number and new work e-mail address, and simply remember a handle for their acquaintance, where the handle does not need to change every time one of the contact mechanisms that underlies the handle changes. Rather, the handle, by whatever mode submitted, may be mapped to the various communication modes and contact mechanisms (such as e-mail addresses and telephone numbers) for a user, so that the user can keep those mechanisms updated without bothering the user's acquaintances. In addition, the user may establish various routing rules to control how the user is contacting, and via which contact mechanism, where such rules may depend at least in part on the time of day or day of the week when the contact is made, the identity of the person seeking to make contact, and other similar factors that may affect a user's decisions regarding how to be contacted.

In a first general aspect, a computer-implemented method is described. The method includes obtaining, at a computer system, a plurality of different contact identifiers for a computer account holder, wherein the identifiers represent a plurality of different communication modes; identifying a handle for the account holder, wherein the handle is associated with a uniform resource locator; and correlating the handle with the plurality of contact identifiers, and storing the handle and plurality of contact identifiers together so as to permit retrieval of the contact identifiers in response to identification of the handle.

In a second general aspect, a computer-implemented communication management method is described. The method includes receiving at a computer system a handle for an account holder submitted by a computing device; providing, for presentation to the computing device, a group of contact identifiers from a plurality of different communication modes; and electronically connecting the computing device to the account holder by one of the plurality of communication modes in response to a selection by the computing device of a contact identifier corresponding to the one of the plurality of communication modes.

In a third general aspect, a computer-implemented communication system for identifying contact identifiers for an account holder is described. The computer-implemented communication system includes an interface to obtain a plurality of different contact identifiers for a computer account holder, wherein the identifiers represent a plurality of different communication modes; an account manager to identify a handle for the account holder, wherein the handle is associated with a uniform resource locator; and a correlator to correlate the handle with the plurality of contact identifiers, and store the handle, the plurality of contact identifiers together so as to permit retrieval of the contact identifiers in response to identification of the handle.

In a fourth general aspect, a computer implemented communication system for assisting in forming communication sessions is described. The computer implemented communication system includes an interface to receive a handle from a user of a computing device, wherein the handle is associated with a uniform resource locator; a central database associating a group of contact identifiers for an account holder to the uniform resource locator; and a communication mode selector to receive a mode indicator and one or more contact identifiers from the database and to select the contact identifier using a communication mode corresponding to the mode indicator to connect a third party for communication with the account holder.

In a fifth general aspect, a computer implemented communication management method is described. The method includes electronically providing a user account handle; retrieving a plurality of contact identifiers correlated with the user account handle; displaying the plurality of contact identifiers, each contact identifier being different from another contact identifier and associated with a contact rule; and receiving, at a computing device, at least one modification of one of the contact identifiers.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

In general, this document describes mechanisms for providing a single point of contact for a user so that third parties may contact the user through various forms of communication without having to use more than the single point of contact. Contact information for the single point of contact may be supplied to third parties who are acquaintances of the user, in one example, through a website that the third parties may visit. The contact information may be tailored to individual third parties or groups, e.g., family may obtain one set of contact information, friends another set, and work contacts a third set of contact information (where the various sets may overlap). The user may also update a particular contact identifier, for example, a work phone number, without needing to update customers, vendors, or co-workers of the contact information change, because the single point of contact may stay fixed while the various contact mechanisms that are made available there to third parties may change. The single point of contact may be designated by a handle, such as an alphanumeric code that can be resolved to a particular web page or IP address. The handle may be a unique string appended to a particular URL as a pointer to a file containing the user's contact information.

A third party may also retrieve information and "slurp" a user's contact information, in the form of the particular contact mechanisms, without the need to copy the information on an individual basis. The third party may store the information for later use on various client devices, e.g., a home computer, an e-mail account, a mobile device, or a home phone, or the third party may use the handle each time to contact the user. Likewise, some clients may allow the third party to choose the method of contact for the user and choose the handle in order to have the client retrieve the particular contact identifier correlated with the handle. For example, instead of providing an individual contact mechanism like a work phone number, the third party can simply supply the invariant handle along with an argument like "work," and a service may route the third party to the user via the user's current work telephone number. In this manner, a user may update contact information on a regular basis without the concern that various friends, family, or work associates may be unable to contact the user.

Figure 1:
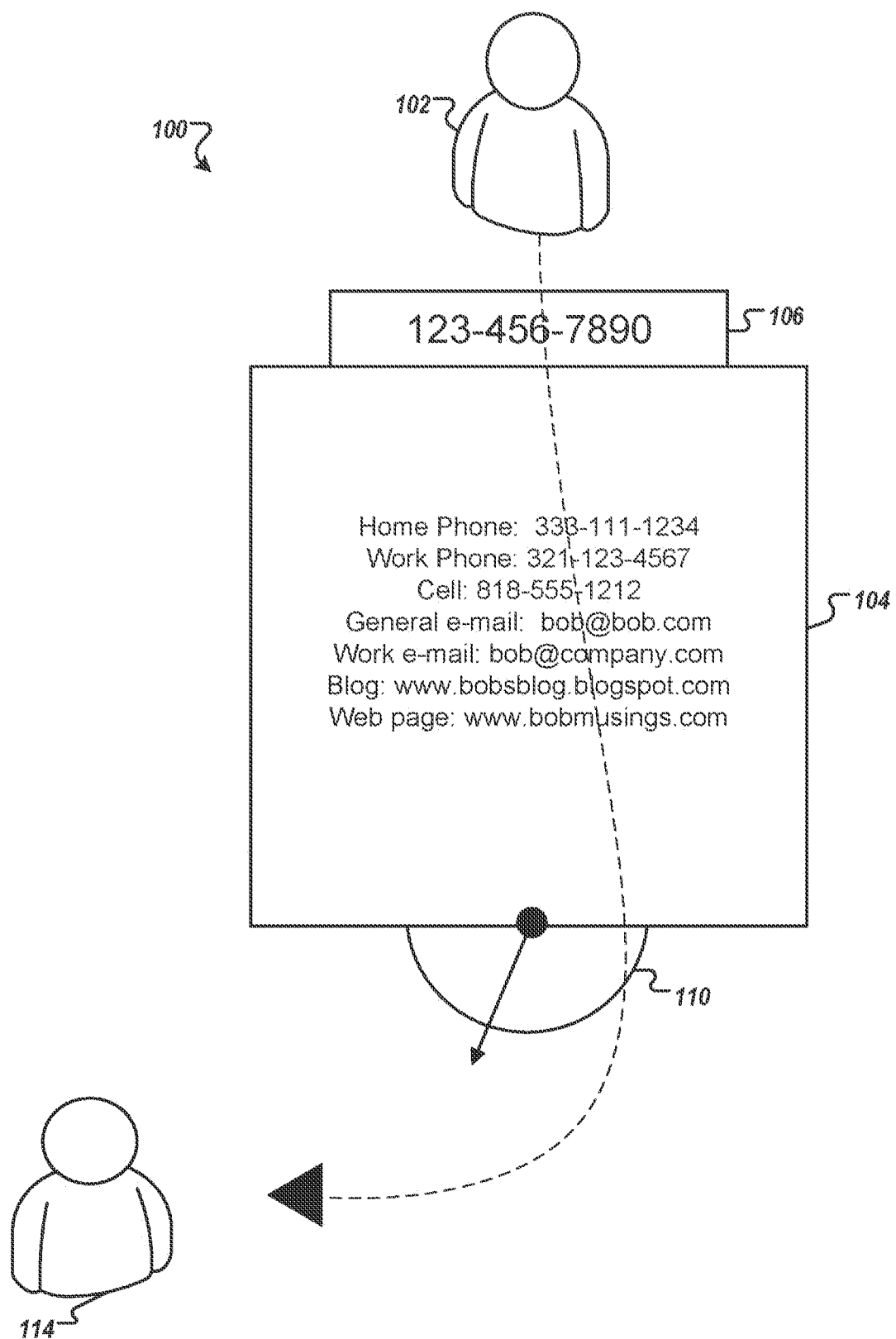
FIG. 1 is a conceptual diagram of a system for retrieving a user's various contact identifiers correlated to a handle.

FIG. 1 is a conceptual diagram of a system 100 that connects third party 102 to a user 114 of the system 100 by one of a number of contact mechanisms, where the particular contact mechanism could be specified by the third party 114 or the user 102. In general, the system 100 may allow the third party 102 to provide a single handle, or perhaps the handled plus additional basic information, in order to contact the user 114 by various mechanisms, without having to know the contact information for those various contact mechanisms. The contact mechanisms may also take a variety of formats, such as telephone, e-mail, and the like.

In the example system 100, a third party 102 is shown submitting to the system 100 a handle 106, which in this example is a 10-digit telephone number. The third party 102 in this example is trying to contact user 114 (whether directly, by leaving a message for user 114, or by being shown content such as a web page that user 114 has generated) by one of a variety of mechanisms. Although the handle 106 takes the form of a telephone number here because users are accustomed to memorizing such numbers and to assigning them as contact mechanisms, the handle 106 can take a variety of forms that "look" different than a telephone number, such as by looking like the person's full name or like an e-mail address.

Various contact identifiers 104 are shown by which user 114 may be contacted. These contact identifiers are from a plurality of different modes of communication, such as telephone, e-mail, and others. A mode of communication is a particular distinct type of communicating, where each user may be contacted by one or more contact identifiers for any particular mode. For example, the user reflected in FIG. 1 has three telephone numbers, and thus three contact identifiers for the telephone mode of communication (in addition to the handle 106, which may act like a telephone number).

A routing mechanism 110 controls how the third party 102 communicates with the user 112 when the third party 102 provides the handle 106 to the system 100. In particular, the handle may be correlated with a particular contact mechanism of a particular mode of communication. With respect to the telephone mode of communication and telephone numbers as contact mechanisms, the handle may correlate much as a telephone handle is correlated to other telephone modes of contact in a system such as the known GRAND CENTRAL system. However, the handle in this example may also be correlated with multiple modes of communication, so that when the third party 102 provides the handle, the third party 102 is connected by a technique other than a telephone call, such as via e-mail. As a result, the handle may, in certain implementations, be a universal handle for contacting the user 114, by whatever desired mode.

The particular mode of communication may be set by the user 114, by the third party 102, or by one or more rules such as rules defined by the user 114. For example, the user 114 may manually set a flag that indicates their currently-preferred mode of receiving communications. As one example, the user 114, as they enter a large meeting or another location in which a telephone call would be inappropriate, may log into a system and indicate that their preferred mode of communication is one of a number of textual modes, such as e-mail or chat. The third party 102 may indicate the preferred mode by accompanying their submission of the handle 106 to the system with a mode indicator. For example, the third party may type "123-456-7890 email" along with text for an e-mail message in order to e-mail another user. The system 100 will then interpret the request appropriately and form an e-mail message to the user 114 at an e-mail address that the system has determined to be an appropriate e-mail address. For example, if the system 100 matches a domain relating to the sender to a business-related domain for the user 114, the system 100 may send the e-mail message to the user's work e-mail account. In contrast, if the domain is a domain such as "aol.com" or a domain on a whitelist for the user (such as an old college friend), the e-mail message may be sent to a personal account.

The user 114 may also establish rules of various forms for selecting a communication mode. For example, if the user does not like to receive telephone calls or check voice mail over the weekend, but does carry a smart phone with them, they may set their mode of communication to e-mail, so that third parties are induced to send them e-mails. A mix of third party 102 defined mode and user 114 defined contact identifier under a mode may also be employed. For example, a third party 102 may identify e-mail as the mode of communication, and then user-defined rules may determine which e-mail account, from multiple e-mail accounts associated with the user, is to receive the e-mail. Responses by the user 114 may likewise be generalized to reflect the handle in the "from" field, rather than the particular e-mail account used by user 114.

Where the third party 102 does not dictate the mode of communication and the user's preferred mode of communication does not match a mode that the third party initially selects, the third party 102 may be prompted to user the other mode. For example, the third party may initially dial the handle 106 as part of a telephone call. The system 100 may determine that the user 114 currently wants to be contacted by e-mail, and may thus play a message such as "If you would like to contact Bob at the moment, please e-mail him at xyz@xyz.com." The system 100 may also transmit data to the third party's computing device so as to start a form e-mail that is automatically addressed to the user 114, or may simply send an e-mail from the user's account to the third party 102 (e.g., where the third party's telephone number can be determined from ANI or caller ID data, and can be correlated to an e-mail address for the third party 102, such as through an address book for the user 114), so that the third party 102 can simply reply to the incoming e-mail.

In some implementations, the mode indicator may be preselected based on the client device that the third party 102 uses. For example, if the third party 102 is using a mobile phone to transmit the handle 106, the system 100 may directly connect the third party 102 to the user 114 via the telephone number in the contact identifiers 104. Alternatively, if the third party's client device has more than one mode of communication (e.g., a smart phone), the third party 102 may be provided with various modes of contacting the user 114, including phone, web page, IM, and e-mail, all associated with the handle 106.

As noted above, in this example, the handle 106 includes a telephone number or is in the form of a telephone number, "123-456-7890." The use of a telephone number may be useful for an individual to remember, given that telephone numbers are commonplace in that many countries use Arabic numerals to some extent. Alternatively, the handle 106 may include an alphanumeric string. For example, the handle 106 may be the user's name or the user's preferred e-mail address or street address. Likewise, the handle 106 may be a portion of the user's full telephone number with a country or state code, or both, e.g., "US-MN-456-7890."

While the contact identifiers 104 are shown here conceptually as a virtual list from which a router 110 selects one identifier for connecting the third party 102 to the user 114, they may also be actually displayed to the user 114 or third party 102 when such a party accesses a web page in the form of a contact page and directs their attention to the user 114, such as by entering the handle 106 for the user 114 or by entering one of the contact identifiers 104 for the user 114. Such a contact page can show contact identifiers that are a subset of a full set of contact identifiers. For example, if the third party 102 is a new acquaintance to the user 114, the user 114 may provide for a small subset of contact identifiers to be shown to the third party 102, such as a work phone number, work e-mail address, and website. In some implementations, the user 114 can provide the third party 102 with a password to access a larger subset of the full set of contact identifiers. Likewise, the user may provide group-specific passwords to provide different subsets of the full set of contact identifiers to different groups, e.g., family, friends, coworkers, and acquaintances. In one implementation, access to contact identifiers may be coordinated with user statuses in a social networking site, where strangers may be shown limited contact identifiers, acquaintances (which have been affirmatively approved by the user) may see additional identifiers, and an "inner circle" of friends may see even more identifiers (e.g., home phone numbers and the like).

Similarly, the third party's contact identifiers may already be associated with the user's account. For example, the user 114 may have an address book of contacts stored as a part of his or her user account. Contact identifiers for the third party 102 may be associated with an entry for the third party 102 in the address book. For example, a client device for a third party may transmit an identifier, e.g., an e-mail address, telephone number, or IM account name, with the handle 106. The identifier may be associated with a group access level or an individual access level for a subset of contact identifiers.

In these manners, one or more third parties may use a handle such as handle 106 to contact user 114 and/or to see information about the user 114. In one example, the handle 106 is provided so as to connect the third party 102 to the user 114 via one of a number of different contact identifiers and modes of communication. In another example, the handle 106 is used to allow the third party 102 to see information about the user 114, such as various contact identifiers associated with the user 114. As a result, the third party 102 can take advantage of a number of different communication techniques vis-a-vis the user 114 without having to memorize or otherwise manage a large number of different contact identifiers, each of which may change over time. Instead, the third party 102 can, in proper implementations, simply record.

Figure 2A:
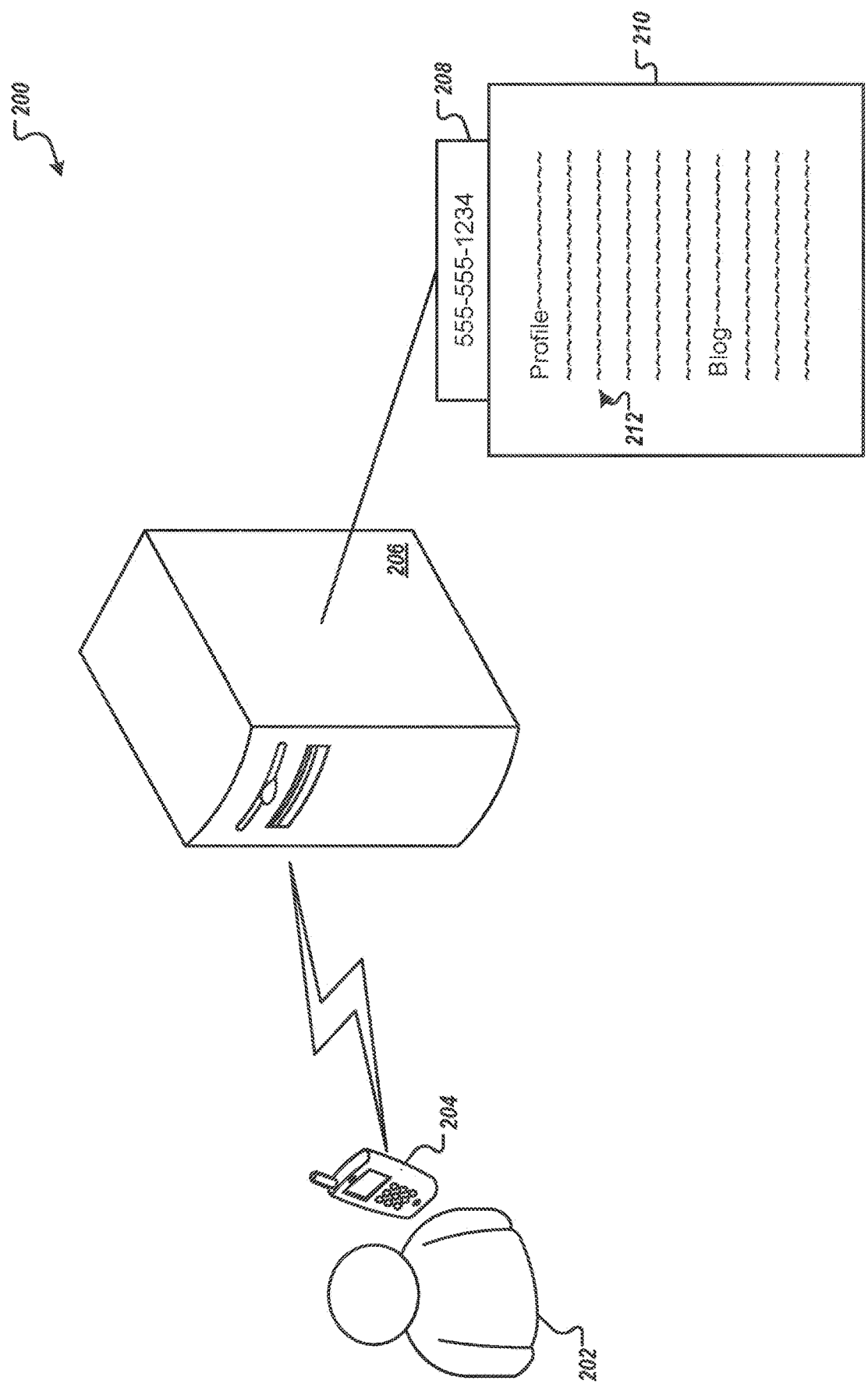
FIG. 2A is a schematic diagram of a system for retrieving a user's various contact identifiers correlated to a handle.

FIG. 2A is a schematic diagram 200 of a system for retrieving a user's various contact identifiers correlated to a handle. In general, the system 200 permits various third parties to access and retrieve contact identifiers for users that have user accounts, using a single handle to identify a particular user account. The system 200 includes a third party 202 using a client device 204 to transmit a request to a contact identifier server 206, the request including a handle 208. The contact identifier server 206 may store the handle 208 with a contact page 210 along with contact identifiers 212 for a user account.

The contact identifier server 206 may store contact identifiers for at least one user account correlated to a handle 208. A plurality of contact identifiers may be correlated with a single handle, and a plurality of different communication modes may be represented by those identifiers. In some implementations, the contact identifier server 206 may automatically update data on a client device 204 for a third party when a particular user account is updated. For example, the contact identifier server 206 may receive data from the user for the account to update a phone number. The contact identifier server 206 may store the data and send an automatic update to any third party device associated with the previously stored phone number, such as users who are identified as friends of the main user in a social network. For example, where a main user has changed their work phone number, the contact identifier server 206 may send information reflecting that changed number to accounts of acquaintances of the main user, e.g. by sending a new user.vcf card with the new work phone number for MICROSOFT OUTLOOK.

In some implementations, the update may be sent upon a request sent from the third party to the contact identifier server 206. For example, if the client device 204 transmits a request for a user's IM contact identifier, the contact identifier server 206 may update the client device 204 with a new IM contact identifier when the contact identifier server 206 connects the client device 204 to a user's device to communication through instant messaging. Likewise, the new IM contact identifier can be transmitted before the connection is made, while the connection is occurring, or after the instant messaging connection has ended.

Alternatively, the handle 208 may be the only identifier saved on the third party's client device 204. The handle 208 may be stored in a list of handles on the client device 204, where each handle corresponds to a particular acquaintance of the third party, and the third party makes communication connections simply using the various handles. For example, on a mobile phone, the third party may have an address book of handles for various user accounts, including the name of a particular user assigned as a pseudonym for each handle. In some instances, the third party may be able to designate a particular alias for a user, e.g., an IM screenname or an image. The handle 208 may be part of a Uniform Resource Identifier, e.g., a URL containing the handle 208 5555551234, "http://www.example domain.com/5555551234."

The third party's client device 204 may be one of a variety of client devices, such as a mobile device, a smart phone, a laptop computer, a desktop computer, or a landline. The client device 204 may provide a mode identifier to the contact identifier server 206 so that the contact identifiers transmitted to the client device are limited to contact identifiers with which the client device 204 can make a connection. For example, the client device 204 can be a laptop computer with a VoIP application, an e-mail application, a web browser application, and an IM application. The contact identifier server 206 may then transmit contact identifiers including telephone numbers, e-mail addresses, blogs, websites, and an IM account name compatible with the particular IM application.

Figure 2B:
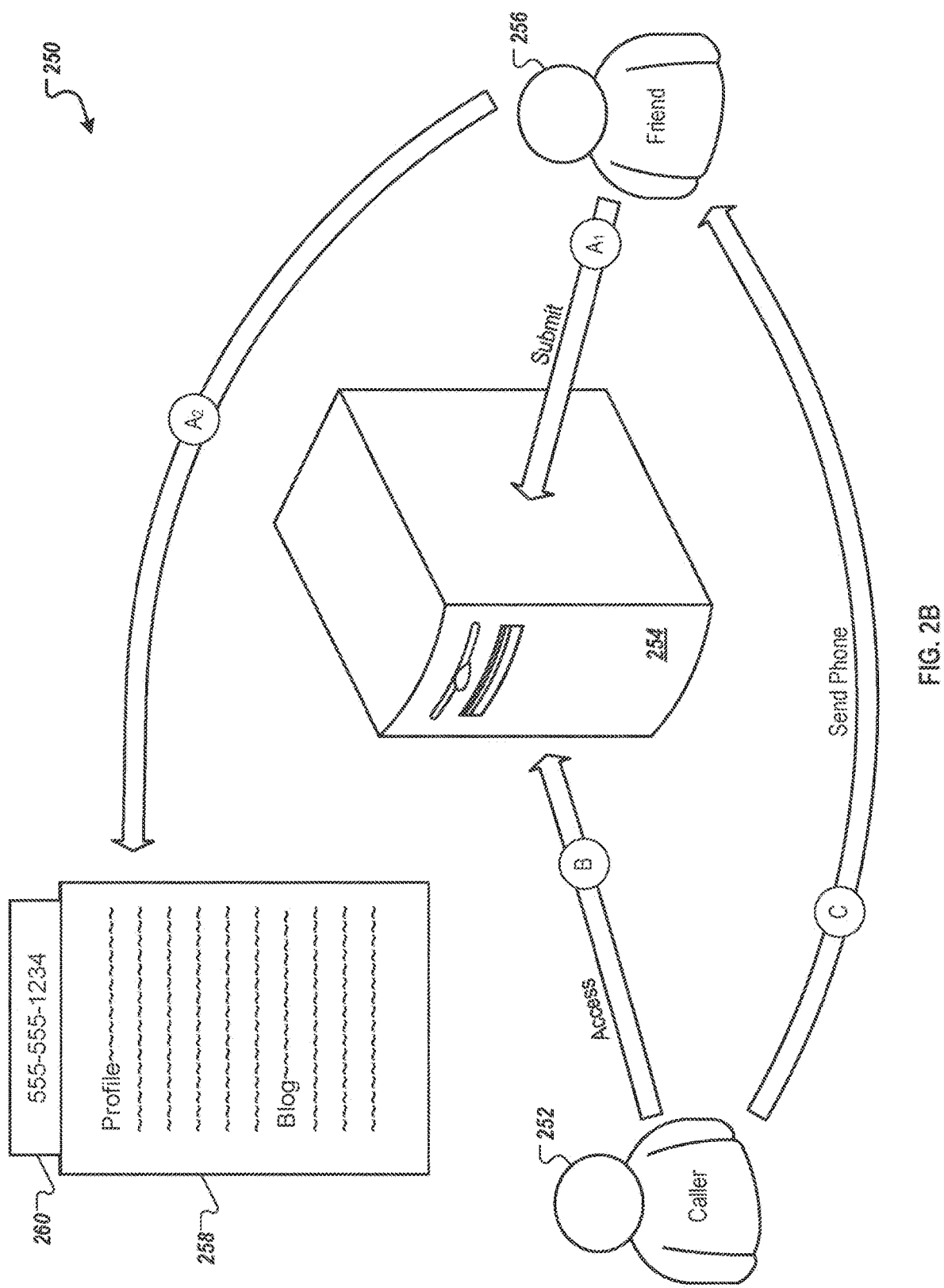
FIG. 2B is a sequence diagram depicting examples of interactions between clients and servers.

FIG. 2B is a sequence diagram 250 depicting examples of interactions between a caller 252, a contact identifier server 254, and a friend 256 of the caller 252 to retrieve for the caller 252 contact identifiers using a handle 260 for the friend 256. The sequence diagram shows the friend 256 providing contact identifiers to the contact identifier server 254, the caller 252 accessing information from the contact identifier server 254 using the handle 260, and the caller 252 contacting a friend 256 using the handle 260. In some implementations, both the caller 252 and the friend 256 may have accounts with contact identifiers stored on the contact identifier server 254.

In the figure, the friend 256 initially submits information (indicated by Arrow $A_1$) to the contact identification server 254. The friend 256 provides his contact identifiers 258 (indicated by Arrow A2) correlated to a handle 260. The caller 252 transmits a request (indicated by Arrow B) to the contact identifier server 254 to access information for the friend 256. The caller 252 is directly connected to the friend 256 (indicated by Arrow C) using a contact identifier provided by the contact identifier server 254.

In some implementations, the contact identifiers 258 may also be stored on a personal computing device. For example, a computing device used by the caller 252 may store one or more of the contact identifiers that the contact identifier server 254 may grant to the caller 252. The computing device may use the stored contact identifiers to connect to a computing device associated with one or more of the contact identifiers correlated with the user's handle 260. For example, the caller 252 may have a cell phone that receives a cell phone number for his friend 256 from the contact identification server 254. The cell phone may store the cell phone number for his friend 256. The cell phone can use the received cell phone number to connect to a cell phone of the friend 256. Likewise, the computing device may compare a stored list of contact identifiers with the contact identifiers 258 provided by the contact identifier server 254 to update one or more contact identifiers that the friend 256 may have updated since the caller 252 last sent a request to the contact identifier server 254.

Alternatively, the connection may be made from the caller 252 to the friend 256 through the contact identifier server 254. This connection may be made during the grant of the request for access or after the request for access is granted. For example, the friend 256 may have a preferred method of contact associated with his user account, e.g., an e-mail address. The caller 252 may request information using a smart phone, and the contact identifier server 254 may provide the smart phone with the e-mail address. An e-mail application on the caller's computing device may receive the e-mail address and generate a new message using the e-mail address in the "To:" field. Similarly, if the caller 252 wishes to call the friend 256, the caller 252 may designate "phone" as a method of contacting the friend 256. The contact identifier server 254 can receive this request along with the handle 260 and connect the caller 252 with the friend 256 via a telephone connection.

In some implementations, the caller 250 can access contact identifiers 258 from the contact identification server 254 through a query, using the friend's personal information to gain access to the account for the user. For example, the caller 252 may not know the handle 260. If the caller 252 provides personal information for the friend 256, e.g., a name, an e-mail address, or a telephone number, the contact identifier server 254 may provide access to one or more other contact identifiers to the caller 252. For example, the caller 252 may already have the work e-mail address for his friend 256, but not have the work phone number for his friend 256. If the caller 252 provides the work e-mail address to the contact identifier server 254 in a request for the work phone number, the work e-mail address may act as a password or security identifier to the contact identifier server 254. The contact identifier server 254 may associate the work e-mail address with the work phone number or a work address. The work e-mail address may also be associated with a cell phone number. In some implementations, the contact identifier server 254 may be associated with a website similar to white pages, where the website provides a search tool to find a handle for a user account. For example, if the caller 252 enters the friend's name, the website may provide the handle 260.

Figure 3:
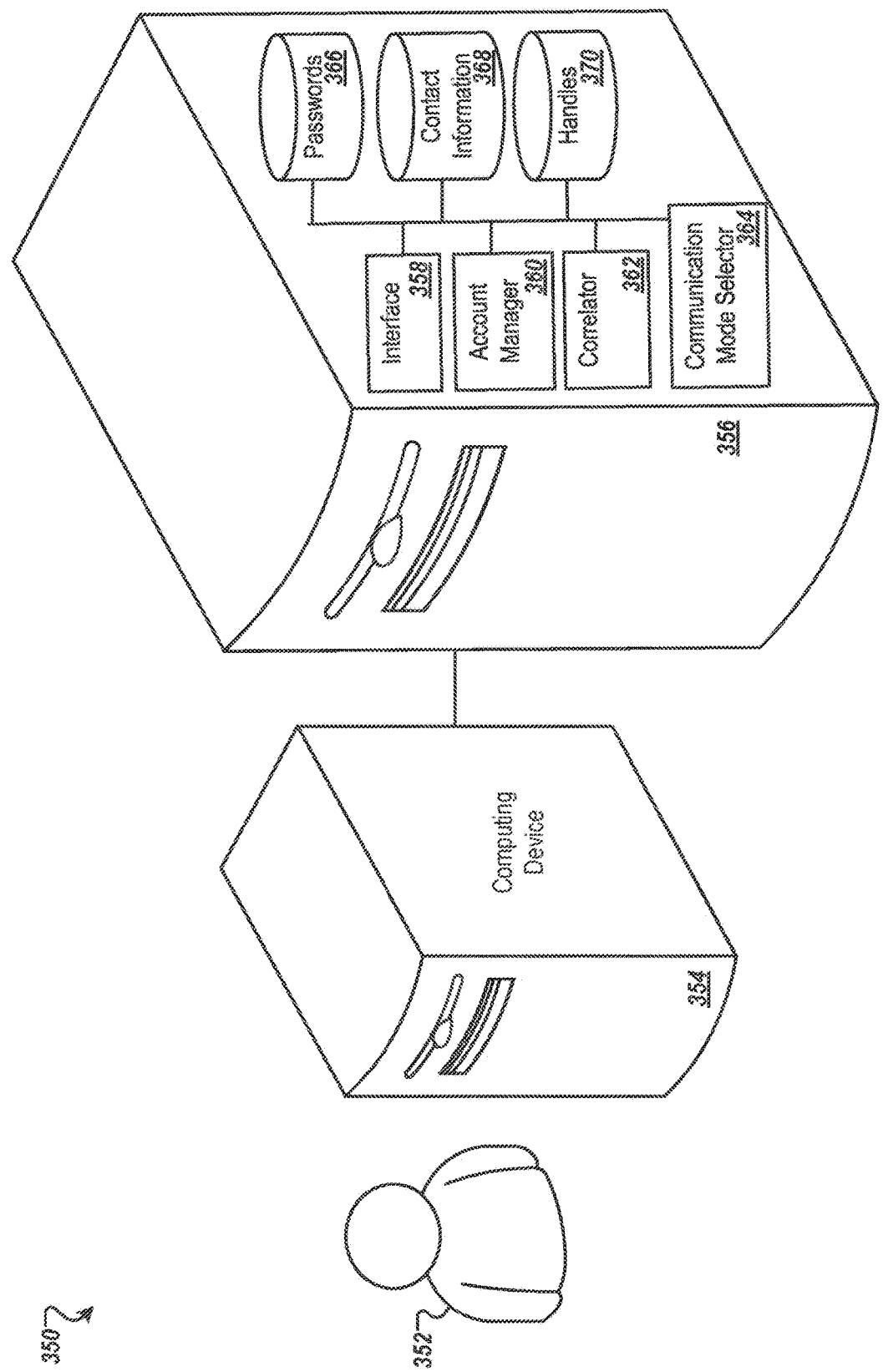
FIG. 3 is a schematic diagram of a system for correlating a handle with contact identifiers.

FIG. 3 is a schematic diagram of a system 350 for correlating a handle with contact identifiers, and for retrieving the contact identifiers correlated with the handle. In general, the system 350 permits users to create user accounts that are represented to the outside world by a handle and that internally correlate to a plurality of different contact identifiers representing a plurality of communication modes. The system 350 then lets other users search user accounts for information about people or organizations they are trying to contact, where the system may provide such searching users with the handle, and the users may then use the handle to contact another user in various manners and using various different communication modes.

A user 352 may interact with the system 350 using a computing device 354 to connect with a server 356. Such communication may occur over one or more networks (not shown), which may include portions of the internet. The server 356 may be various devices, for example, a single computing device, multiple servers in a cluster, or multiple computing devices spread over the internet in a cloud. The server 356 may assist in providing contact identifiers to the computing device 354. Likewise, the server 356 may correlate contact identifiers with a handle for a user account. The computing device 354 may be provided with one or more communication applications such as a telephony application, IM application, and e-mail application, which may employ a handle to begin a communication session with a target user that corresponds to the handle.

The server 356 contains a number of components that permit it to provide a user's computing device 354 with a connection to contact identifiers that have been correlated with a handle. For example, an interface 358 may handle communications with remote devices such as computing device 354. The interface 358 may, for example, receive requests from the computing device 354 for contact identifiers correlated to a handle. The user 352 may send a handle, such as "612-555-1234," to request contact identifiers (in the form of e-mail addresses, telephone numbers and the like) for a particular user account holder. The contact identifiers may relate to various modes of communication, e.g., telephone, e-mail, instant messaging, blogs, and websites that are associated with a user who corresponds to the handle. The interface 358 may receive this handle and provide contact identifiers in response. The requesting user may employ such identifiers to update contact information for the other user stored in the computing device 354 or in a contact database associated with a user account for the user 352.

Once the interface 358 receives data, it may transmit the data to another component such as an account manager 360, which is responsible for providing consistent and personalized interaction with registered users of system 350. The account manager 360 may identify a handle for a particular user in the received data. The handle may be correlated to a uniform resource locator (URL). For example, the handle may be included in a URL for a website: "http://www.examplehandle.com/612-555-1234." The account manager 360 may also identify passwords for particular accounts. For example, the user 352 may provide a password to set up or edit a user account. Likewise, users may provide passwords to gain access to various subsets of contact identifiers correlated to a particular handle. For example, the user account can be set so that users with a "family" password have access to a mobile phone number and home phone number, but not a work phone number.

The server 356 may also include a correlator 362 that correlates received handles with contact identifiers relating to the handles. In particular, the correlator 362 may be programmed to perform a look-up function on the handle, and to return a list of contact identifiers for the handle, where the list may be limited based on an authorization level of a user that is requesting the information. For example, only close friends that have full authorization may be shown a contact identifier for a home telephone number or very private e-mail account. The correlator 362 may also cause the handle, the contact identifiers, and pointers connecting the handle to the contact identifiers to be stored for later use. The correlator 362 may also correlate passwords with particular handles or particular contact identifiers. In some implementations, the correlator 362 may store the user account data in a single database. Alternatively, the correlator 362 may store the user account data in multiple databases.

A database storing information for the server 356 may have various data stores that are used to correlate lists of contact identifiers for user accounts to the corresponding uniform resource locators for such accounts. In some implementations, the database may include a passwords data store 366, a contact information data store 368, and a handles data store 370. The passwords data store 366 may contain passwords for the user account, including a password for editing the contact identifiers for a particular user account (e.g., where the "owner" of the account is accessing the information) and passwords for accessing various contact identifiers for a particular user account (e.g., where acquaintances of the "owner" are seeking information). The contact information data store 368 may contain contact identifiers for various users. In some implementations, the contact information data store 368 may also contain data regarding preferences for particular contact methods, groups for particular contact identifier subsets, and other user-preference data. The handles data store 370 may store handles for various user accounts. The handles may be integers, as in telephone numbers, alphanumeric strings, images, or other unique identifiers. Generally, the handles data store 370 and the contact information data store 368 may be combined in the form of a look-up table that is indexed according to particular user handles.

The server 356 may also include a communication mode selector 364 to receive a mode indicator. The mode indicator may provide information as to the selection of communication method that has been selected for making contact between user 352 and another user. For example, the communication mode selector 364 may receive a "mobile" mode indicator for the user 352 indicating that the user 352 wants to call the other user's cell phone. Such a mode indicator may accompany the handle, as may other mode indicators such as "e-mail" and "home phone", so that user 352 merely needs to remember or store the single handle, and then add a general description of the communication mode—rather than having to remember or store a separate identifier for every way in which the user 352 can contact the other users.

Also, certain aspects of the mode indicator can be controlled by the target user either explicitly or via contextual rules. For example, the user 352 may use a telephone to dial another user, and the call may be routed to server 356. The server may recognize the call, via DNIS information received from the telephone system or from other data, as being directed to the particular handle, and may access information about the user that is the target of the call. For example, the system may determine that, at the current time, the target user would prefer to receive e-mail messages. As a result, the server 356 may use a voice synthesis module to speak a message to user 352, such as "The user you are calling would prefer to receive e-mail for the next 24 hours. Press 1 to leave a voice message that will be transcribed into an e-mail message or e-mail the user at bob@acme.com."

The communication mode selector 364 may also receive one or more contact identifiers from the database, e.g., the contact information data store 368. Where multiple contact identifiers are received for a particular mode, the appropriate mechanism for contacting the target user by that mode may need to be determined. For example, the communication mode selector 364 may receive a home phone number, a cell phone number, a URL for a website, and an e-mail address for a home e-mail account. The communication mode selector 364 may initiate a communication session between the user 352 and the other user according to one of the communication modes. For example, the communication mode selector 364 may use a telephone mode indicator and then look at the target user's schedule to select the cell phone number for the other user, and cause the user 352 to be connected to the cell phone of the target user. The schedule may be set by rules provided by the target user, such as rules defining that the target user is to be contacted at his or her work number during work hours and at his or her cell phone after hours (and perhaps that all calls should automatically roll to a central voice mail or voice mail to e-mail transcription service during sleeping hours). Thus, the communication mode selector 364 can select a particular mode based on inputs from an initiating party, from a target party, or from rules set up by or selected by one of the parties, and can also select a particular contact identifier from multiple identifiers that may exist for a particular communications mode, by which to complete the communication.

Figure 4A:
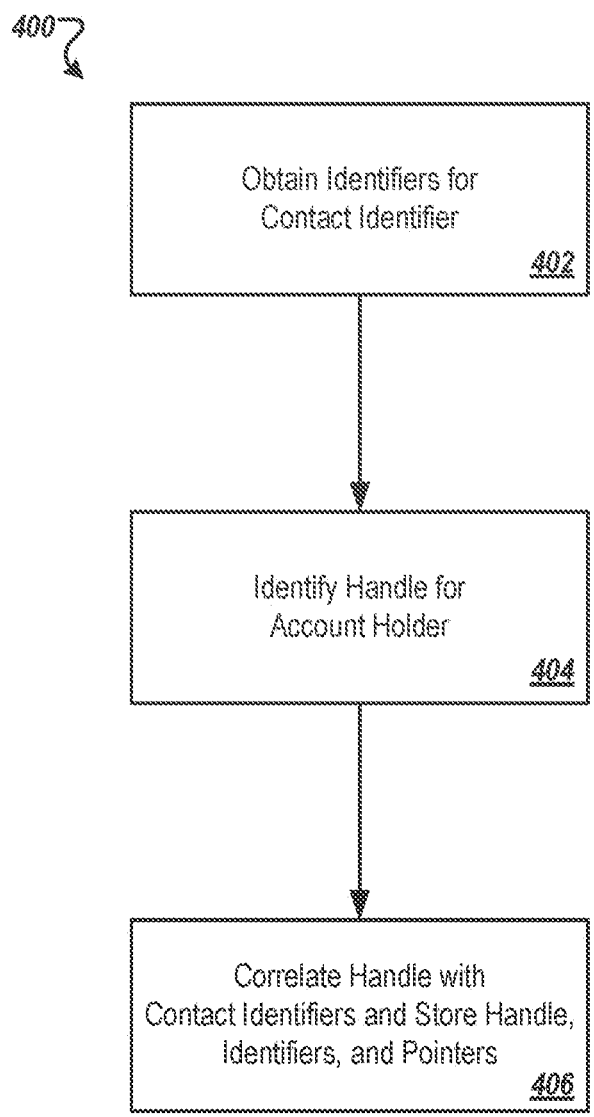
FIG. 4A is a flowchart showing actions taken to correlate a handle with contact identifiers.

FIG. 4A is a flowchart showing an example of a process 400 for correlating a handle with contact identifiers. Such a process may be employed by a user of a central connecting service who wants to initially set up a count by selecting a handle and then supplying all of the user's various contact identifiers to be correlated to the handle. The process 400 shows one example of generating a user account with contact identifiers across multiple modes of communication, correlated with a single user handle. The single user handle allows the user's contacts to communicate with the user in various communication modes without requiring the contacts to store information regarding the user's various contact identifiers separately or having to update the contact identifiers as the user changes individual contact identifiers.

At an initial step, the process 400 obtains (402) identifiers for a plurality of contact identifiers for a computer account holder. For example, the identifiers may be unique identifiers for particular mechanisms of communication under various communication modes for a particular user. The communication modes, e.g., blogs, instant messaging, telephone, mail, and e-mail, can each have multiple unique identifiers for each of the mechanisms by which the user can be contacted. For example, in instant messaging, a user may have an MSN MESSENGER identifier, an AMERICA ONLINE Instant Messenger identifier, and a GOOGLE TALK identifier.

The process 400 then identifies (404) a handle for the account holder. For example, the handle may be a string that the user selects when setting up his account, such as the user's full name or a particular phone number. The handle can also be selected by the process for the user, such as in the manner that telephone numbers are provided for selection by a user seeking a new telephone number. In some implementations, the handle may be correlated to a URL. For example, the URL may be a website address for a unifying presence site, e.g., "http://www.exampleonesite.com." The correlated handle may navigate to a unique page designated for the account holder. For example, the URL correlated with the handle may be "http://www.exampleonesite.com/612-555-1234."

The process 400 then correlates (406) the handle with the plurality of contact identifiers. For example, the user's instant messenger accounts and e-mail addresses may be correlated with the handle "612-555-1234." In some implementations, the process 400 may store the handle, the plurality of contact identifiers, and pointers connecting the handle to the plurality of contact identifiers in a database. For example, the system 350 described in FIG. 3B may store the handle, the plurality of contact identifiers, and the pointers in multiple data stores, e.g., the handles data store 370 and the contact information data store 368. Also, the handles may be stored in an index field of a look-up table, with the contact identifiers stored in a target field of the same table so that a simply look-up on the handle field may return the corresponding contact identifiers.

In this manner, a user of a computing system may register their contact information, which may span multiple mechanisms for connecting and multiple modes of communication, with a central service. The service may then correlate such mechanisms with a single common handle by which the various forms of information may more easily be recovered or used by other users, such as by being used to connect to the first user in a communication session.

Figure 4B:
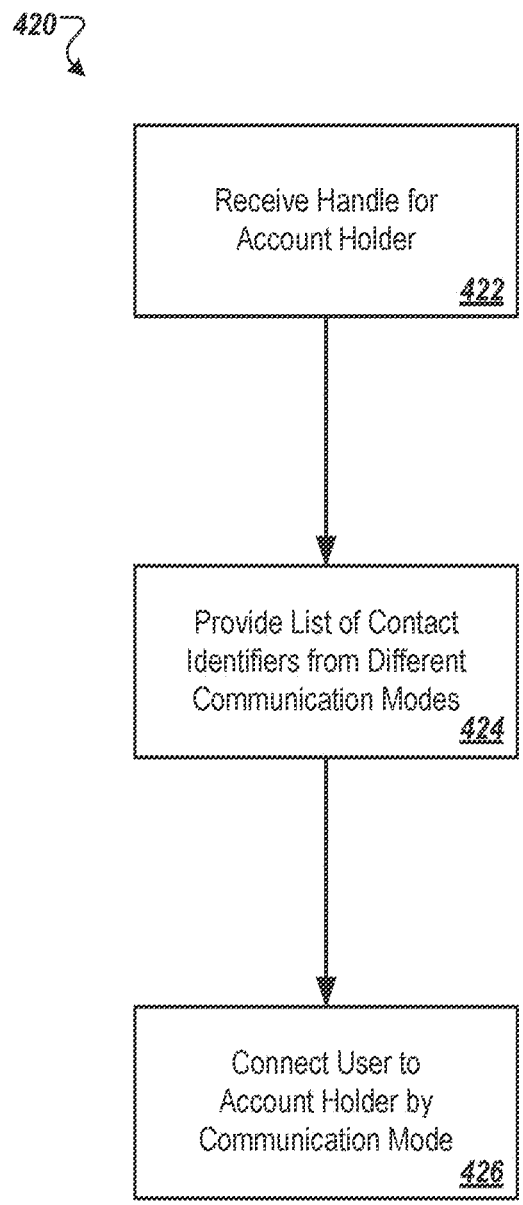
FIG. 4B is a flowchart showing actions taken to retrieve a user's contact identifiers correlated with a handle.

FIG. 4B is a flowchart showing an example of a process 420 for retrieving an account holder's contact identifiers correlated with a handle. Such retrieval may be performed by someone searching for the user/account holder discussed in FIG. 4A or by an acquaintance of such an account holder. The acquaintance may have received the handle from the account holder, and may want to find out the latest contact information for the account holder. The process 420 shows one example of receiving a handle from a user and using the handle to identify contact identifiers for a particular account holder, though other examples may also be used. The handle allows the user to communicate with the account holder in various communication modes while only requiring the user to provide the single handle.

At an initial step, the process 420 receives (422) a handle for an account holder submitted by a user of a computing device. For example, the computing device may submit the handle "ChakaKhan"—a name that is unique enough that it alone could serve as a unique identifying handle. The handle can provide a unique identifier for the process 420 to identify a particular account of an account holder. Likewise, the process 420 may request a password before providing information about other contact identifiers, such as a home telephone number or work e-mail address.

The process 420 then provides (424) a list of contact identifiers from a plurality of different communication modes to the user of the computing device. For example, the list of contact identifiers may include a home mailing or e-mail address, a work address, a work website, a Twitter account identifier, and a cell phone number. In some implementations, different subsets of the list of contact identifiers may be provided. For example, the process 420 may only provide the work address and cell phone number to a person given "Work" group access, while a person designated as belonging to a "Friend" group may be provided the home address and the Twitter account. Groups may be designated through various mechanisms. For example, the process 420 may determine the level of access through password requests or the process 420 identifying the client device used to request contact identifiers.

At box 426, the process connects the user to the account holder by one of a plurality of communication modes. For example, a work e-mail address may be propagated to a word processing document, with the address field preset to the account holder's work e-mail address. In some implementations, the connection may be made in response to a selection by the user of the computing device of a contact identifier corresponding to the one of the plurality of communication modes. For example, the user may choose "Feed" to read the most recent Twitter post by the account holder.

In some implementations, the handle may be correlated to a URL. As in an example for FIG. 4A, the URL may be a website address for a unifying presence site, e.g., "http://www.exampleonesite.com." The process 420 may receive a request with the URL "http://www.exampleonesite.com/612-555-1234", retrieve the account for "612-555-1234", and map the request to a contact identifier included in the account.

Figure 5A:
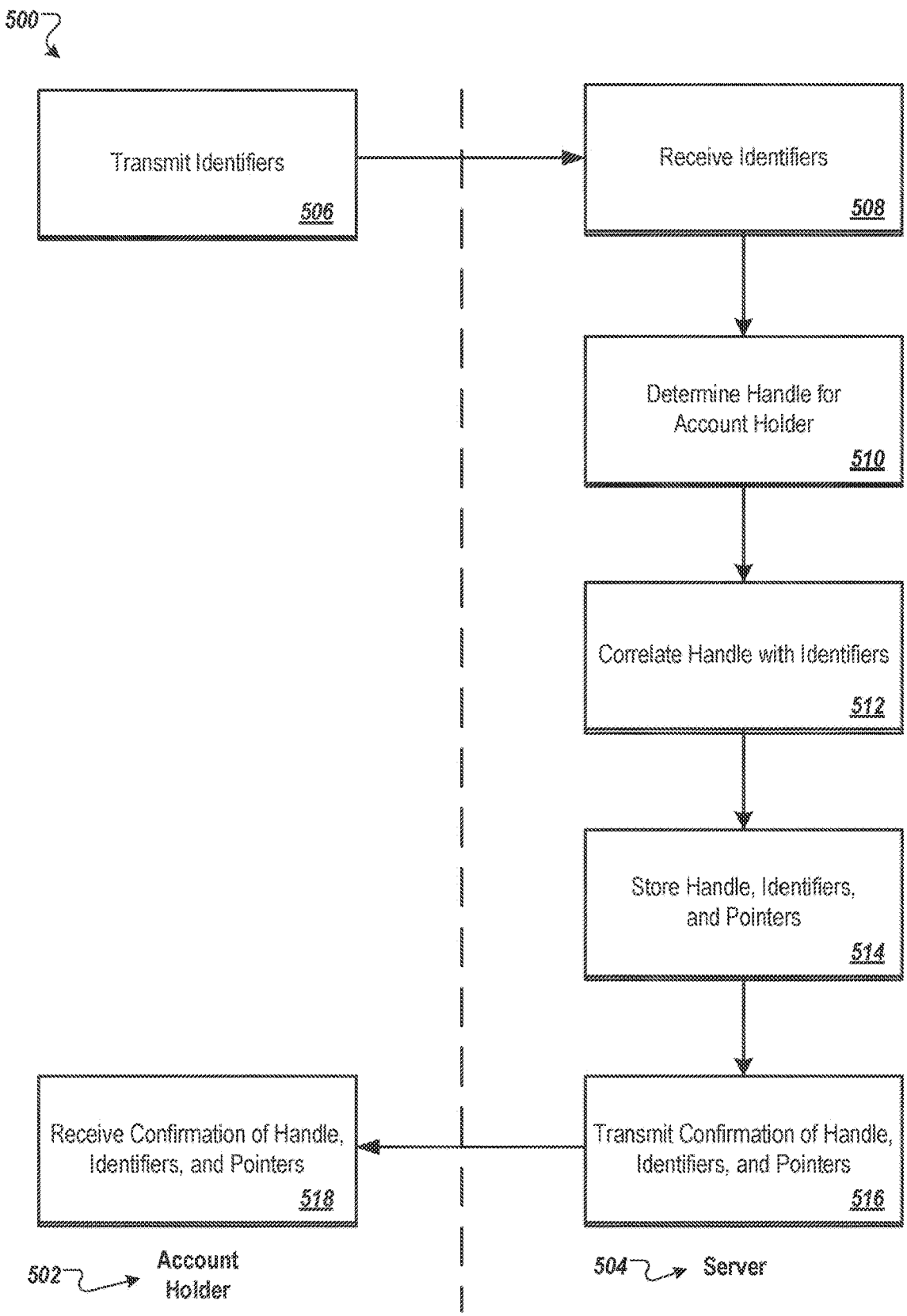
FIG. 5A is a sequence diagram for generating a user account to correlate a handle with a user's contact identifiers.

FIG. 5A is a sequence diagram for depicting an example of interactions 500 between an account holder 502 in a communication system and a server 504. The process shown here is similar to that shown in FIG. 4A, and provides a more explicit indication of exemplary manners in which an account holder and a server system can interact in correlating identifiers with a single user handle. In general, the interactions involve a server generating a user account, assigning a handle to the user account, and correlating a number of contact identifiers with the account.

In the figure, the account holder 502 initially transmits identifiers (box 506), such as e-mail addresses, telephone numbers, and instant message accounts, to the server 504. Such a transmission may occur after the account holder 502 initially establishes his or her account. The server 504 then receives the identifiers (box 508) and determines a handle (box 510) for the account holder 502. In some implementations, the account holder 502 provides input to the server 502 regarding a choice of handles. For example, the account holder 502 may provide an initial suggestion of a handle along with the first identifiers that the account holder transmitted to the server 504. Alternatively, the server 504 can also provide a handle without input from the account holder 502.

The server 504 then correlates the handle with the identifiers (box 512). Such correlation may occur by storing the handle and the identifiers together in a look up table so that entry of the handle to the table causes the identifiers to be provided. At box 514, the server 504 stores the handle and the identifiers in a database such as in a look up table. In certain implementations, pointers from a handle to the identifiers may also be stored. As shown in FIG. 3, the identifiers and the handle need not be stored in the same location, though they may. In some implementations, the pointers may be stored with the handle, or, alternatively, the pointers may be stored with the identifiers. The pointers may also be stored in a third location, separately from both the identifiers and the handle.

Once the server 504 has stored the account information, the server 504 transmits a confirmation (box 516) that the handle and identifiers (and optionally the pointers) have been recorded and correlated to each other. The confirmation may be a complete listing of all the information, a confirmation containing the handle and identifiers, or simply the handle. The account holder 502 then receives the confirmation at box 518. The confirmation can be received in various formats, including an HTML-embedded e-mail, an instant message, a web page, a text message on a cell phone, or a generated voice message.

Figure 5B:
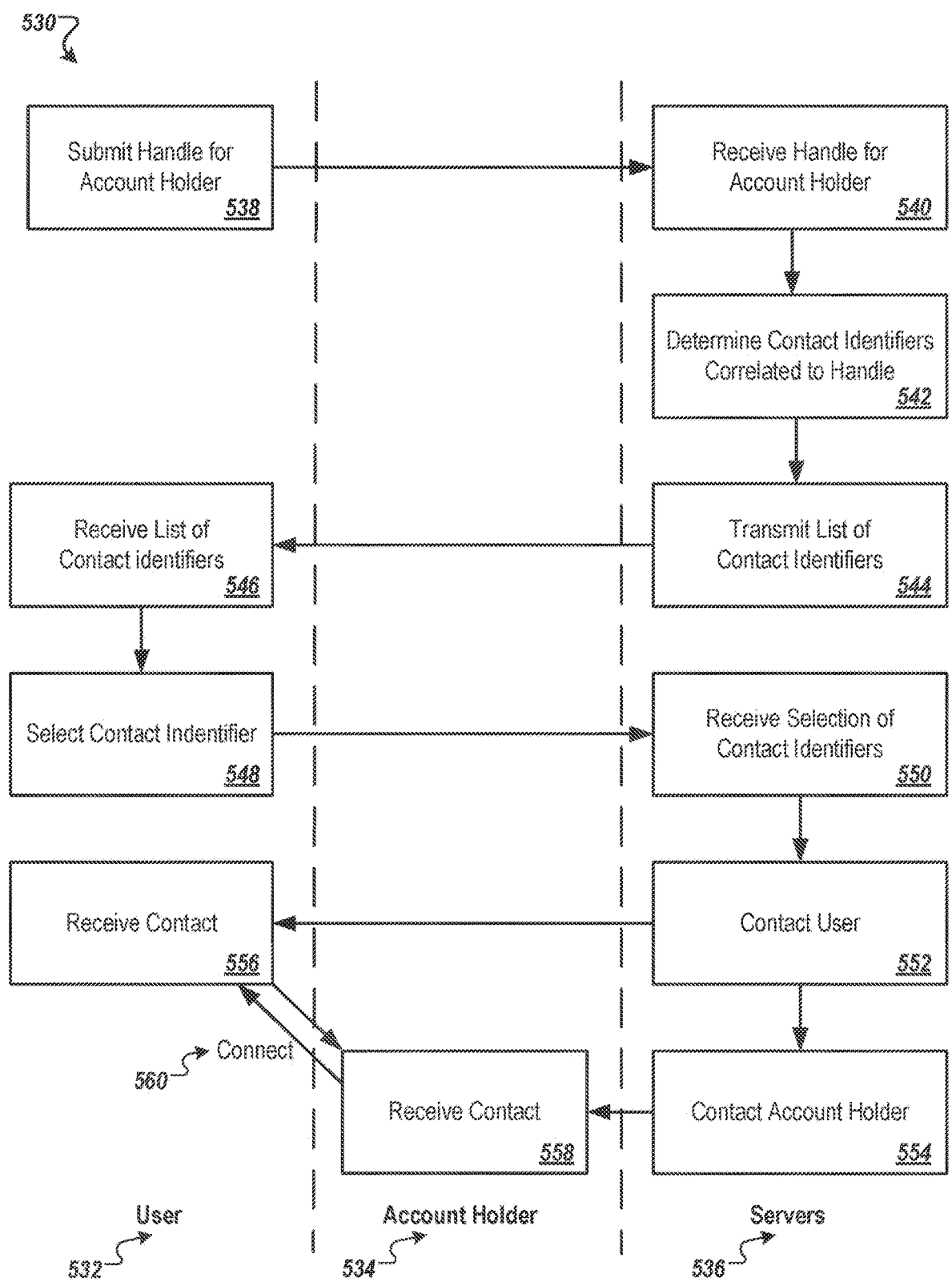
FIG. 5B is a sequence diagram for retrieving a user's contact identifiers correlated with a handle.

FIG. 5B is a sequence diagram that depicts an example of interactions 530 between a user 532, an account holder 534, and servers 536. By the process, a third party use may submit a handle to a central system where the handle corresponds to an account holder in the system. The system then identifies a communication mode and mechanism by which the account holder should be contact, and automatically carries out the necessary steps to cause such communication to occur. As such, the process shown here is similar to that shown in FIG. 4A, and provides a more explicit showing of exemplary manners in which a third party can contact the account holder without having to remember or provide detailed contact information. In particular, the servers 536 may be part of a unifying identifier system and may communicate with various client devices, such as cell phones, laptop computers, landlines, and smart phones to provide an ease of communication between the user 532 and the account holder 534 and also to more accurately provide the user's and account holder's preferred methods of communication. In this manner, the connection may be easier for the user 532 because the user 532 need only remember a single handle and perhaps some generic control information (e.g., a common term that identifies the mode of communication), and in certain implementations, the particular contact identifier may be kept anonymous from the user 532. For example, where the contact is made through the servers 536, an actual e-mail address or telephone number may be masked using a system address or number via a bridging mechanism similar to that for e-mail communications using on-line services such as CRAIGSLIST.

In the example process, the user 532 initially submits to a group of servers (536) a handle for an account holder (box 538). The servers 536 receive the handle (box 540), such as a telephone number appended to a URL. The servers 536 then determine contact identifiers (box 542) correlated to the handle. The contact identifiers may be selected from a larger group of contact identifiers for the account holder 534, and may include one or more identifiers within each of a plurality of communication modes. For example, the user 532 may be an unknown individual to the account holder 534. Therefore, the account holder 534 may store a setting that the user 532 will not receive a home telephone number that is stored as one of the identifiers.

At box 544, the servers 536 then transmit a list of contact identifiers to the user 532 and the user 532 receives the list of contact identifiers (box 546). The user 536 may receive the list through an application programming interface (API) so that the contact identifiers can be updated in a client device that the user 532 is using to connect to the servers 536. In this manner, the user 532 may more readily contact the account holder 534 through a variety of methods of communication. For example, the user 532 may wish to call the account holder 534 to discuss an e-mail that the user 532 plans to send to the account holder 534 during the telephone conversation.

The user 532 then selects one of the contact identifiers (box 548). In some implementations, this determination is made through the user's client device that connects to the servers 536. In other implementations, the determination is made because the user 532 is only granted access to one contact identifier, or the account holder 534 has only provided one contact identifier. Alternatively, the user 532 may select from the list of contact identifiers provided. The servers 536 receive the selection (box 550) of contact identifiers. The servers 536 then attempts to connect the user 532 to the account holder 534 by contacting the user 532 (box 552) and contacting the account holder 536 (box 554). The contact may be a VoIP connection or an instant messaging chat session. The user 532 receives the contact (556) and the account holder 558 receives the contact (558). If both the user 532 and the account holder 534 accept the contact, the user 532 and the account holder 534 are connected (560). The connection may be a direct connection, such as through landlines, a routed connection through the servers 536, or a connection through a third party service, such as an instant messaging connection.

In certain implementations, the users may be connected directly, such as by the user 532 submitting a handle and receiving a telephone number in return. The telephone number then may be dialed automatically by the user's client device, such as via an automatically executing dialing link in a mark up document sent by the server 536.

The connection may also be made automatically through the servers 536. For example, the servers 536 may include servers for completing a VOIP telephone connection, and may carry out the necessary steps to connect the user 532 and the account holder 534. Such an implementation is particularly well-suit for keeping contact identifiers of the account holder 534 private, and not sending any information about the identifiers (or at least some of the identifiers) to the user 532. Such an approach may be useful when an account holder is working from home and would like to be reached at home, but does not want people calling his or her work number to get access to his or her home number.

Figure 6A:
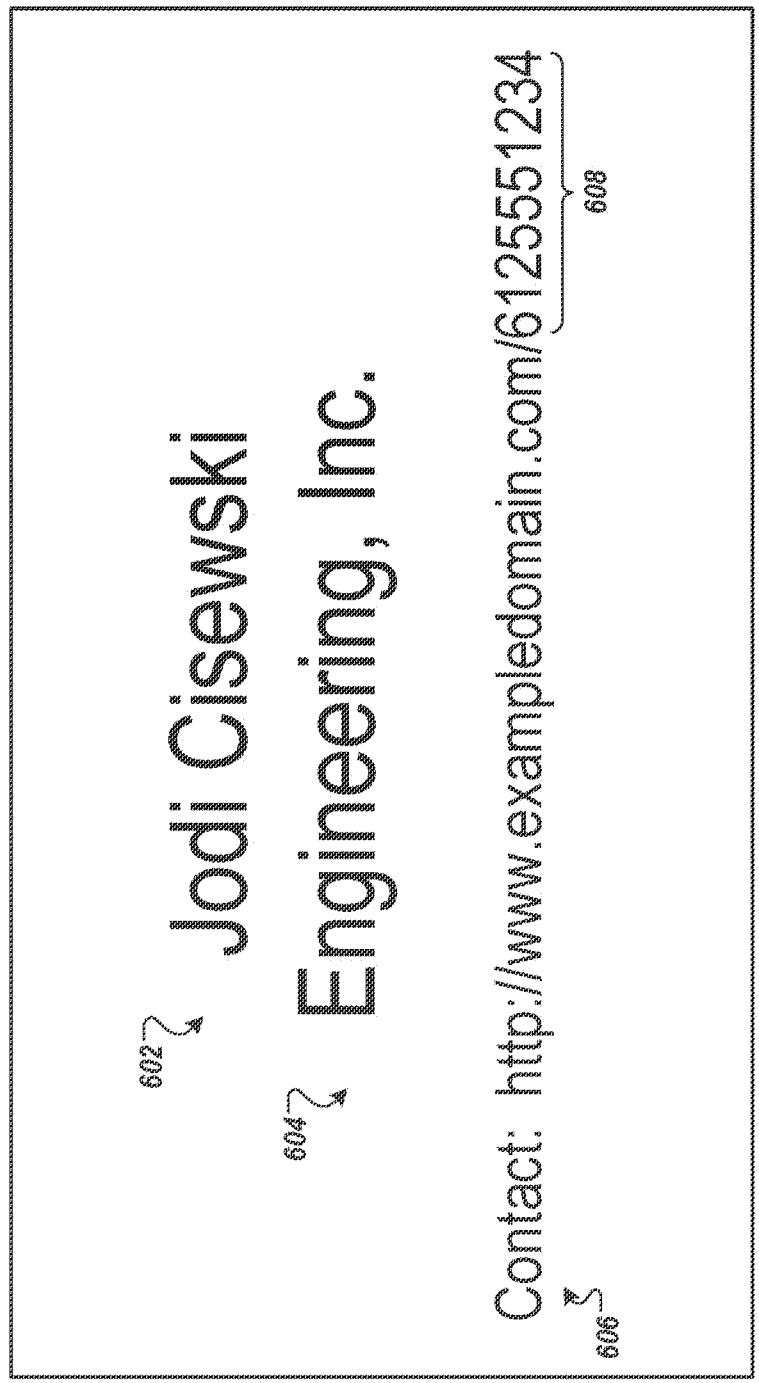
FIG. 6A is an exemplary universal business card.

FIG. 6A is an exemplary universal business card 600. The universal business card 600 may be in an electronic or hard copy format. The universal business card 600 shows one example of how an account holder like the account holder discussed above may share contact information with other users. While a traditional business card may include several telephone numbers and other contact information for a number of modes of communication (e.g., mail, e-mail, telephone, etc.), the universal business card 600 includes a single handle that can be resolved by a central system automatically into one of the modes of communication and a particular mechanism (e.g., telephone number) for that mode.

The universal business card 600, as shown, includes the name 602 of the account holder, shown as "Jodi Cisewski," the employer 604 of the account holder, "Engineering, Inc.," and a link 606 to the user's contact identifiers using a handle 608. As shown, the handle includes a telephone number and is appended to a URL. The URL may also, in appropriate circumstances, be considered to be part of the handle 608. The URL may be a common URL that is easy for user to memorize (e.g., because many of their acquaintances have handles associated with the URL), and the handle may also be an alphanumeric string that is relatively easy for other users to memorize or store. The information underlying the universal business card 600 may be updated under the account holder's control to ensure that people may receive current contact information for the account holder, even as the data shown on the card stays the same. The universal business card 600 also provides a small amount of data for a third-party to receive. In this manner, a third party can see what the cardholder does, and can also be given access to more information about the cardholder without having the card 600 cluttered by detailed information.

Figure 6B:
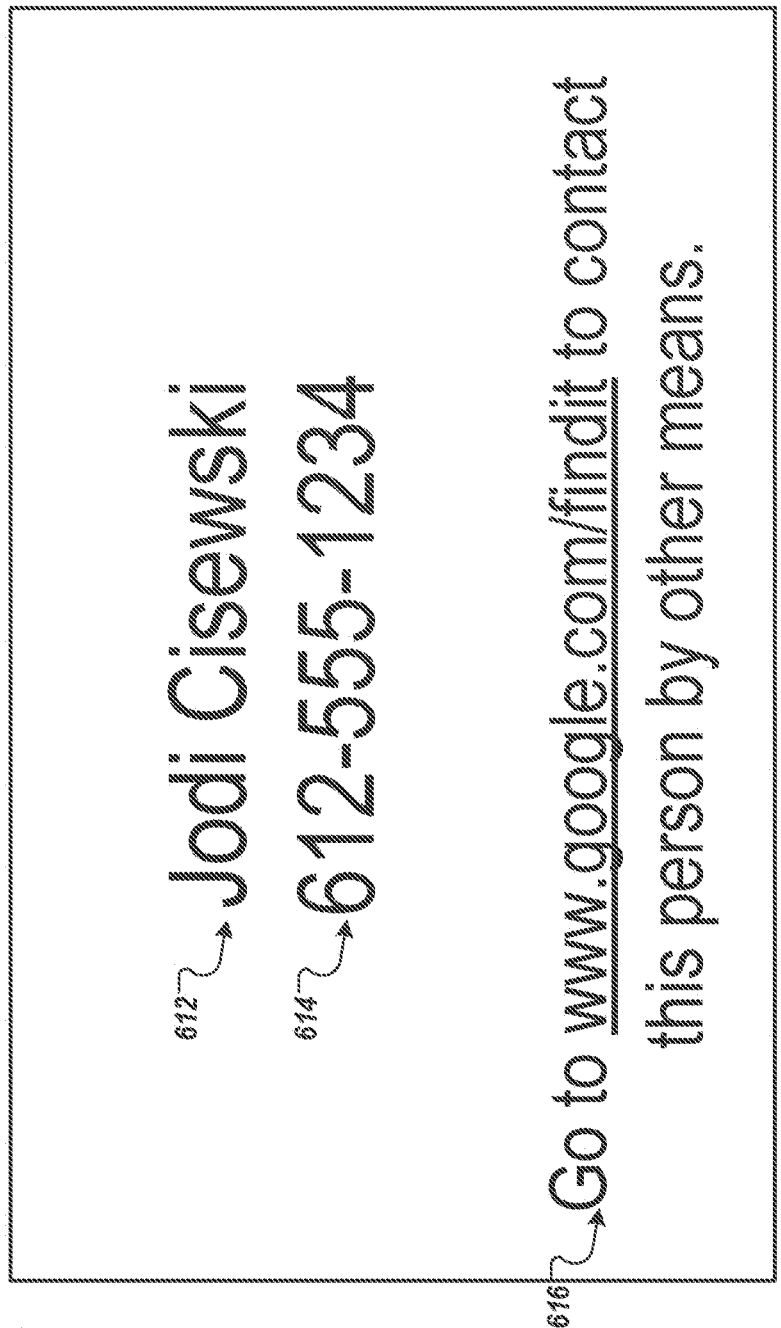
FIG. 6B is a screenshot of a web page for retrieving a user's contact identifiers correlated with a handle.

FIG. 6B is a screenshot of a web page 610 for retrieving a user's contact identifiers correlated with a handle. The web page 610 contains the name 612 of the account holder, a handle 614, and a link 616 to contact the account holder. In some implementations, the web page 610 is the site connected to the link from the universal business card of FIG. 6A. A person looking at page 610 may select the link 616 to be connected automatically to the user, where a central system may automatically select the contact mechanism and mode of communication by which the contact is to occur. For example, if Jodi currently wants to communicate by e-mail, selection of the link 616 may cause a blank e-mail message with a relevant e-mail address for Jodi filled out, to be generated on the same client device that was previously displaying the page 610.

Figure 6C:
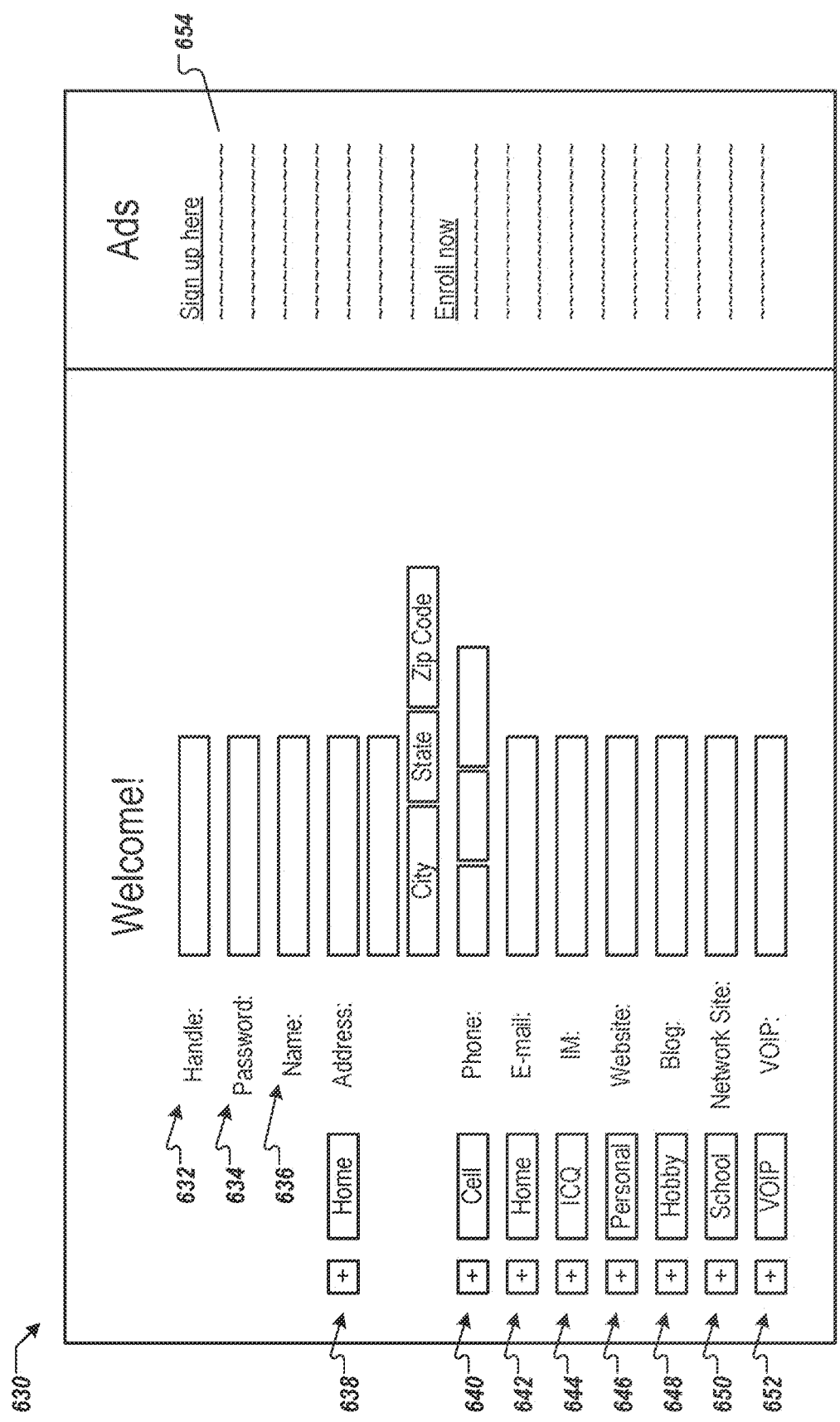
FIG. 6C is a screenshot of a web page for correlating a handle with contact identifiers.

FIG. 6C is a screenshot of a web page 630 for correlating a handle with contact identifiers. The web page 630 provides entry forms for a user to provide contact identifiers for a system to store and correlate the contact identifiers provided with a handle. In FIG. 6C, the fields include a handle field 632, a password field 634, and a name field 636. Other fields include phone 640, e-mail 642, IM 644, website 646, blog 648, networking site 650, and VoIP 652. The fields shown below the name field 636 each have a "+" button so that a user can add more than one of the types of fields display on the web page 630. For example, there may be multiple instant messaging accounts for multiple instant messaging applications or multiple instant messaging accounts for one instant messaging application. If the "+" symbol is pressed, the web page 630 can add another field of the same mode indicator. For example, the address field 638 in FIG. 6C is shown as displaying "home". If the "+" symbol for the address field is selected, the second address field may be marked "work" or "home2".

In some implementations, the web page 630 provides fields for other forms of contact, such as a call sign for an amateur radio broadcaster. In some implementations, the web page 630 may display one or more fields 632-652 that include predetermined information if the system is also connected to a communication mode. For example, if the user has an e-mail account that is accessible through a link displayed on the web page 630, the web page 630 may already display the user's e-mail address, her home page, her user identifier and password for an instant messaging program, her time zone, and any other information she wishes to make public to at least some of the individuals who may access her information through the account. In some implementations, the web page 630 may have a separate page for different groups with different security levels or check boxes or pull-down menus for each field to designate the access level for each group.

In FIG. 6C, the web page 630 also includes a column including advertisements 654. In some implementations, the advertisements 654 may include data based on the information that the user has input to the web page. For example, if the user provides a phone number with an area code "612", the advertisements 654 may include data specific to Minneapolis, Minn. Similarly, the advertisements may include data that is associated with a website or blog, as entered in the website 646 and blog 648 fields.

Figure 6D:
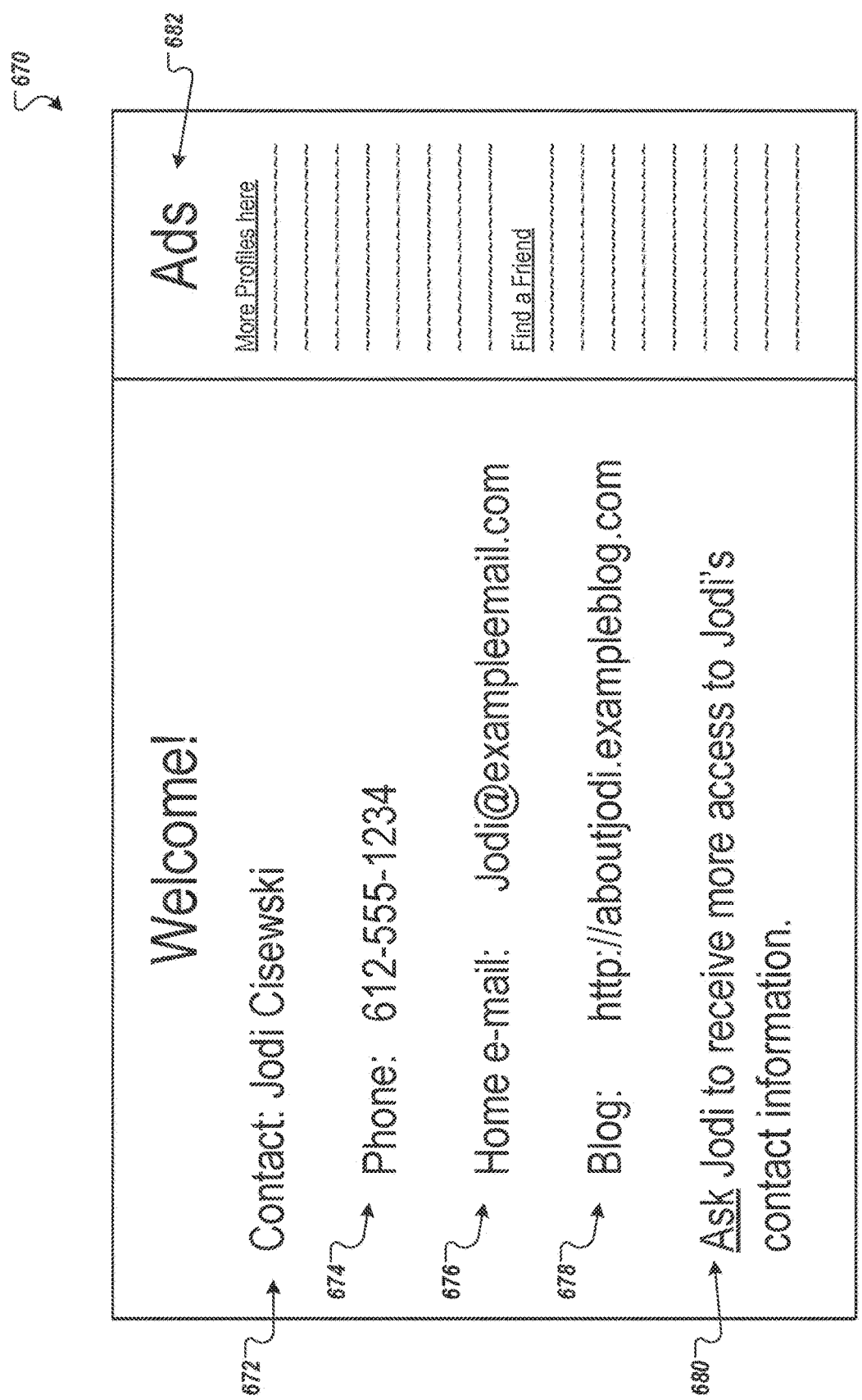
FIG. 6D is a screenshot of a web page displaying a user's contact identifiers correlated with a handle.

FIG. 6D is a screenshot of a web page 670 displaying a user's contact identifiers correlated with a handle. The web page 670 has a contact name 672, a telephone number 674, a home e-mail address 676, a blog link 678, and a contact link 680 to allow a visitor to request further contact identifiers. The web page 670 may be a web page for a specific group, such as a friends group or a family group, or the web page 670 may be intended for a general group. In some implementations, the web page 670 may also include a login area so that viewers can provide a password to access more information.

In some implementations, the web page 670 may also display contact information for an account associated with a group rather than an individual. For example, the user may be a non-profit organization with a changing executive board and contact information. In such an instance, the single point of contact may provide continuity because members or interested parties may not need to update contact points. For example, if an executive board elects a president every year, the new president may update the contact name 672, telephone number 674, and home e-mail address 676 upon his election. The blog link 678 may not need to be changed, however. Likewise, if the third parties have the capability to update the information on an automatic basis, no time would be wasted looking up the new contact information. It would be provided to the third parties upon request.

The web page 670 includes a column for advertisements 682. The advertisements may be specified based on the user account information. The advertisements may also be sponsored. For example, the user may be provided with a financial benefit for each visitor to the web page 670. Similarly, the user may be provided with a financial benefit each time a visitor clicks a link to one of the advertisements 682 on the web page 670.

Figure 7:
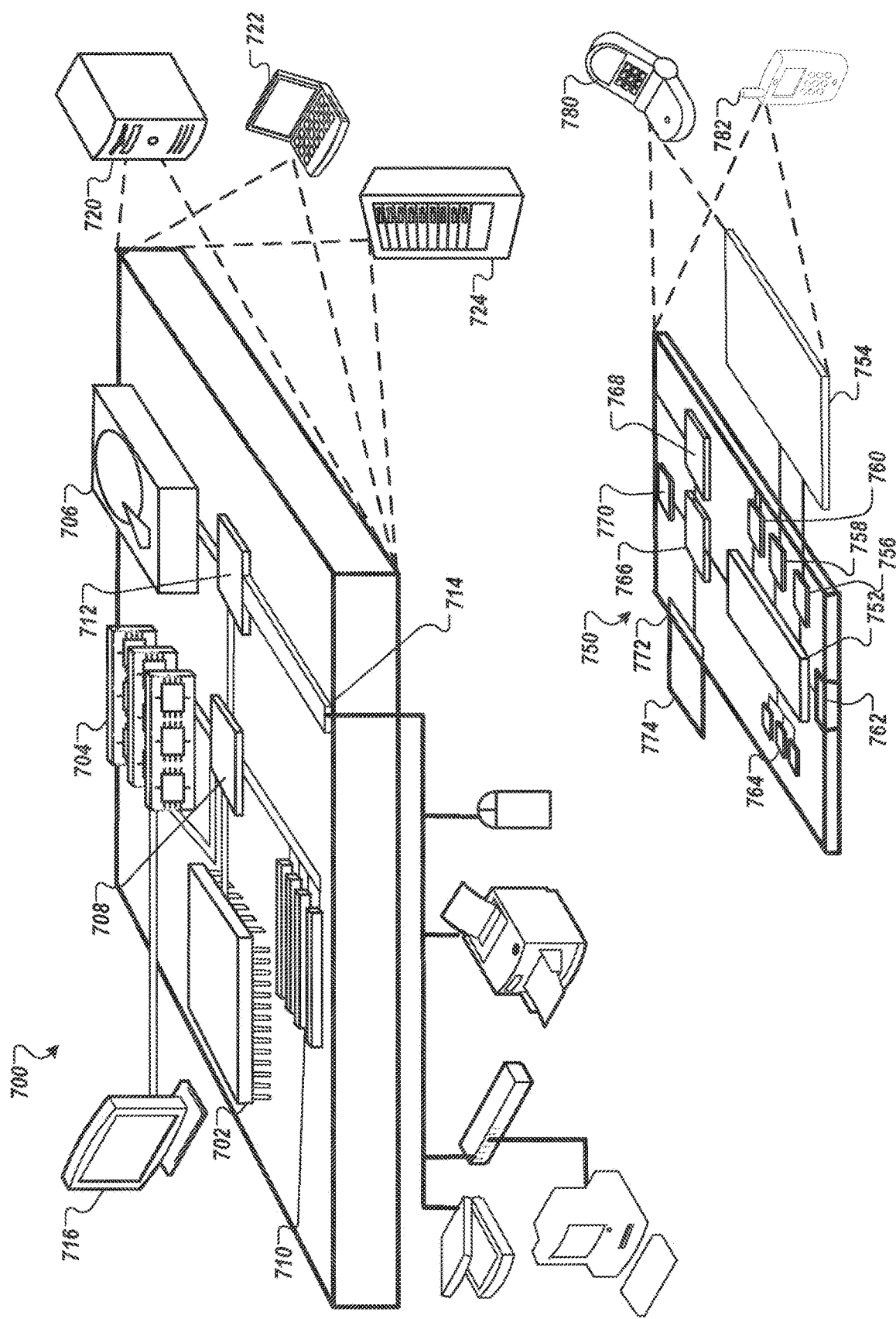
FIG. 7 shows an example of a computer device and a mobile computer device that can be used to implement the techniques described here.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of correlating and retrieving a handle with contact identifiers and methods have been described, it should be recognized that numerous other applications are contemplated. Accordingly, other embodiments are within the scope of the following claims.

What is claimed is:

1. A method comprising:
   providing, to a computer system, a universal handle for a first user including an alphanumeric string;
   providing a password to the computer system after providing the universal handle to the computer system;
   receiving, from the computer system and responsive to providing the password to the computer system, contact information for the first user comprising a plurality of contact identifiers associated with the universal handle, the plurality of contact identifiers including:
   (i) a first contact identifier at which the first user is able to be contacted using a first mode of communication, the first contact identifier different from the universal handle for the first user, and
   (ii) a second contact identifier at which the first user is able to be contacted using a second mode of communication that is different from the first mode of communication, the second contact identifier different from the universal handle for the first user;
   selecting, after receiving the contact information for the first user, the first or the second contact identifier from the plurality of contact identifiers; and
   providing, to the computer system and in response to selecting the first or second contact identifier, a communication request from the second user to connect with the first user using the selected first or second contact identifier.

2. The method of claim 1, wherein the selected first or second contact identifier is a user identity of the first user on a social networking site, wherein the method further comprises receiving the user identity of the first user on the social networking site in response to the second user using the universal handle to search for the first user.

3. The method of claim 2, wherein receiving contact information for the first user is based on a relationship between the first user and the second user on the social networking site.

4. The method of claim 3, wherein the relationship between the first user and the second user on the social networking site is at least one of:
   a friend category that has been accepted by the first user;
   a family category that has been accepted by the first user; or
   a coworker category.

5. The method of claim 1, wherein:
   the selected first or second contact identifier is an email address; and
   the communication request includes a request to transmit an email to the email address.

6. The method of claim 1, wherein the alphanumeric string comprises at least one of:
   an email address for the first user;
   a telephone number for the first user; or
   a name of the first user.

7. The method of claim 1, wherein:
   the selected first or second contact identifier is a telephone number; and
   the communication request includes a request to call the telephone number.

8. The method of claim 1, wherein:
   the selected first or second contact identifier is a telephone number; and
   the communication request includes a request to communicate a multimedia message to the telephone number.

9. The method of claim 1, wherein:
   providing the universal handle to the computer system further comprises providing an indication of a preferred mode of communication; and
   receiving contact information for the first user is based on the preferred mode of communication.

10. A computer system comprising:
    one or more computer processors; and
    one or more non-transitory computer-readable devices that include instructions that, when executed by the one or more computer processors, cause the processors to:
    provide, to a remote computer system, a universal handle for a first user including an alphanumeric string;

provide an indication of a preferred mode of communication with the universal handle;

receive, from the remote computer system based on the preferred mode of communication, contact information for the first user comprising a plurality of contact identifiers associated with the universal handle, the plurality of contact identifiers including:
(i) a first contact identifier at which the first user is able to be contacted using a first mode of communication, the first contact identifier different from the universal handle for the first user, and
(ii) a second contact identifier at which the first user is able to be contacted using a second mode of communication that is different from the first mode of communication, the second contact identifier different from the universal handle for the first user;

select, after receiving the contact information for the first user, the first or the second contact identifier from the plurality of contact identifiers; and provide, to the remote computer system and in response to selecting the first or second contact identifier, a communication request from the second user to connect with the first user using the selected first or second contact identifier.

11. The computer system of claim 10, wherein:
the selected first or second contact identifier is a user identity of the first user on a social networking site; and
the one or more non-transitory computer-readable devices further include instructions that, when executed by the one or more computer processors, cause the processors to receive the user identity of the first user on the social networking site in response to the second user using the universal handle to search for the first user.

12. The computer system of claim 11, wherein the one or more non-transitory computer-readable devices further include instructions that, when executed by the one or more computer processors, cause the processors to receive contact information for the first user based on a relationship between the first user and the second user on the social networking site.

13. The computer system of claim 12, wherein the relationship between the first user and the second user on the social networking site is at least one of:
a friend category that has been accepted by the first user;
a family category that has been accepted by the first user; or
a coworker category.

14. The computer system of claim 10, wherein:
the selected first or second contact identifier is an email address; and
the communication request includes a request to transmit an email to the email address.

15. The computer system of claim 10, wherein the alphanumeric string comprises at least one of:
an email address for the first user;
a telephone number for the first user; or
a name of the first user.

16. The computer system of claim 10, wherein:
the selected first or second contact identifier is a telephone number; and
the communication request includes a request to call the telephone number.

17. One or more non-transitory computer-readable media storing instructions that, when executed by a processor, perform operations comprising:
providing, to a computer system, a universal handle for a first user including an alphanumeric string;
providing a password to the computer system after providing the universal handle to the computer system;
receiving, from the computer system and responsive to providing the password to the computer system, contact information for the first user comprising a plurality of contact identifiers associated with the universal handle, the plurality of contact identifiers including:
(i) a first contact identifier at which the first user is able to be contacted using a first mode of communication, the first contact identifier different from the universal handle for the first user, and
(ii) a second contact identifier at which the first user is able to be contacted using a second mode of communication that is different from the first mode of communication, the second contact identifier different from the universal handle for the first user;
selecting, after receiving the contact information for the first user, the first or the second contact identifier from the plurality of contact identifiers; and
providing, to the computer system and in response to selecting the first or second contact identifier, a communication request from the second user to connect with the first user using the selected first or second contact identifier.

* * * * *